US011930276B2

(12) United States Patent
Lee et al.

(10) Patent No.: US 11,930,276 B2
(45) Date of Patent: Mar. 12, 2024

(54) MONITORING DEVICE AND VEHICLE HAVING THE SAME

(71) Applicants: HYUNDAI MOTOR COMPANY, Seoul (KR); KIA CORPORATION, Seoul (KR)

(72) Inventors: Gunho Lee, Gyeonggi-do (KR); Jae Kyung Choi, Gyeongsangnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 58 days.

(21) Appl. No.: 17/722,585

(22) Filed: Apr. 18, 2022

(65) Prior Publication Data

US 2022/0385823 A1 Dec. 1, 2022

(30) Foreign Application Priority Data

May 26, 2021 (KR) .......................... 10-2021-0067499

(51) Int. Cl.
*H04N 23/695* (2023.01)
*B60R 1/28* (2022.01)
*G06V 20/56* (2022.01)
*H04N 7/18* (2006.01)

(52) U.S. Cl.
CPC ............. *H04N 23/695* (2023.01); *B60R 1/28* (2022.01); *H04N 7/183* (2013.01); *G06V 20/588* (2022.01)

(58) Field of Classification Search
CPC ...... H04N 23/695; H04N 7/183; H04N 23/71; B60R 1/28; B60R 2300/8046; B60R 1/25; B60R 1/26; B60R 1/22; B60R 11/04; B60R 2011/0033; B60R 2011/0085; G06V 20/588; G06V 20/58; B60W 40/02; B60W 40/08; B60W 50/04; B60W 50/14; B60W 2040/0881; B60W 2050/146; B60W 2420/42
See application file for complete search history.

(56) References Cited

U.S. PATENT DOCUMENTS

2021/0297573 A1* 9/2021 Utagawa ................ H04N 23/90

* cited by examiner

*Primary Examiner* — Farzana Hossain
(74) *Attorney, Agent, or Firm* — Morgan, Lewis & Bockius LLP

(57) ABSTRACT

A monitoring device and a vehicle having the same. The monitoring device includes a camera configured to obtain an image; a display configured to display the image; a tilting adjustor configured to adjust a tilting angle of the camera; and a controller configured to recognize a brightness of a first image displayed on the display and control the tilting adjustor to adjust the tilting angle of the camera in response to determining that the recognized brightness is greater than or equal to a reference value, and after adjusting the tilting angle of the camera, control the tilting adjustor to adjust the tilting angle of the camera to an initial tilting angle in response to determining that a brightness of a second image displayed the display is less than or equal to a release value.

20 Claims, 9 Drawing Sheets

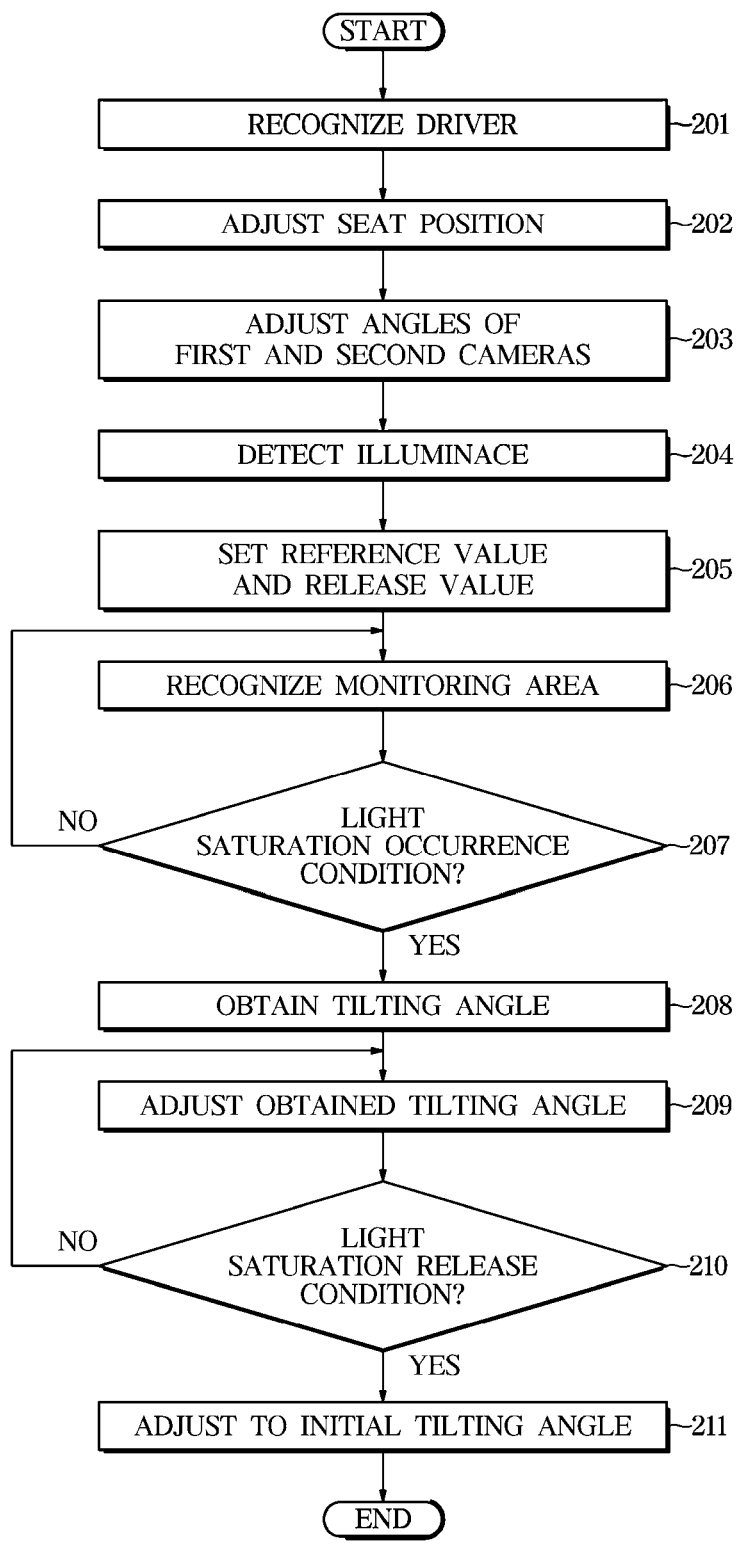

MONITORING DEVICE AND VEHICLE HAVING THE SAME

CROSS-REFERENCE TO RELATED APPLICATION(S)

This application claims the benefit of priority to Korean Patent Application No. 10-2021-0067499, filed on May 26, 2021 in the Korea Intellectual Property, the disclosure of which is incorporated herein by reference.

TECHNICAL FIELD

The disclosure relates to a monitoring device for monitoring a surrounding situation and a vehicle having the same.

BACKGROUND

In general, side mirrors are placed on an exterior of a vehicle body. The side mirrors protrude from front left and right doors by a predetermined length and provide a driver with a view of rear and a view of rear lateral of the vehicle.

Side mirrors that protrude by a predetermined length from front left and right doors receive air resistance while traveling, which causes wind noise. In addition, the side mirrors are difficult to provide a driver with a clear image of the rear side and rear lateral of the vehicle in bad weather.

Therefore, in recent years, cameras instead of side mirrors provide a driver with a view of rear side and/or a view of rear lateral of the vehicle.

As such, when an image of rear side or rear lateral of the vehicle is provided using cameras, light saturation occurs in the cameras due to a light emitted from a light of other vehicles, resulting in preventing a view of rear side and a view of rear lateral of the driver.

In other words, if light saturation occurs in the cameras, a driver could not secure a view of rear side and/or a view of rear lateral of the vehicle. As a result, occurrence of light saturation in the cameras cause a driver low awareness of surrounding conditions, leading to make a driver difficult to change lanes and increase a risk of an accident.

The information disclosed in the Background section above is to aid in the understanding of the background of the disclosure, and should not be taken as acknowledgement that this information forms any part of prior art.

SUMMARY

An aspect of the disclosure is to provide a monitoring device for controlling a tilting angle of a camera in response to that a monitoring area of an image satisfies a condition for generating a light saturation and controlling the tilting angle of the camera with an initial tilting angle in response to that the monitoring area of the image satisfies a condition for releasing the light saturation, and a vehicle having the same.

An aspect of the disclosure is to provide a monitoring device for changing a light saturation generating condition and a light saturation canceling condition corresponding to night and day, respectively, and a vehicle having the same.

Additional aspects of the disclosure will be set forth in part in the description which follows and, in part, will be obvious from the description, or may be learned by practice of the disclosure.

According to an aspect of the disclosure, a monitoring device includes a camera configured to obtain an image; a display configured to display the image; a tilting adjustor configured to adjust a tilting angle of the camera; and a controller configured to recognize a brightness of a first image displayed on the display and control the tilting adjustor to adjust the tilting angle of the camera in response to determining that the recognized brightness is greater than or equal to a reference value, and after adjusting the tilting angle of the camera, control the tilting adjustor to adjust the tilting angle of the camera to an initial tilting angle in response to determining that a brightness of a second image displayed the display is less than or equal to a release value.

The monitoring device may further include an illuminance detector configured to detect illuminance and output illuminance information on the detected illuminance; wherein the controller may determine whether a current time is a day time or a night time based on the illuminance information, set the reference value as a first reference value and set the release value as a first release value in response to determining that the current time is the day time, and set the reference value as a second reference value and set the release value as a second release value in response to determining that the current time is the night time.

The controller may recognize a monitoring area in the first image, and determine whether a brightness of a pixel for each pixel of the recognized monitoring area is greater than or equal to the reference value.

The controller may identify the number of pixels whose brightness is greater than or equal to the reference value among the pixels of the monitoring area, identify a ratio of an area in which the brightness of the pixel is greater than or equal to the reference value to the monitoring area based on the total number of pixels in the monitoring area and the number of identified pixels, and adjust the tilting angle of the camera in response to determining that the identified ratio is greater than or equal to a first ratio.

The controller may control the tilting adjustor so that the tilting angle of the camera is adjusted in response to determining that a time for maintaining the identified ratio greater than or equal to the first ratio is greater than or equal to a predetermined time.

The controller may recognize the monitoring area in the second image, and determine whether a brightness of a pixel for each pixel of the recognized monitoring area is less than or equal to the release value.

The controller may identify the number of pixels whose brightness is less than or equal to the release value among the pixels of the monitoring area, identify a ratio of an area in which the brightness of the pixel is less than or equal to the release value to the monitoring area based on the total number of pixels in the monitoring area and the number of identified pixels, and adjust the tilting angle of the camera to the initial tilting angle in response to determining that the identified ratio is greater than or equal to a second ratio.

The controller may control the tilting adjustor so that the tilting angle of the camera is adjusted to the initial tilting angle in response to determining that a time for maintaining the identified ratio greater than or equal to the second ratio is greater than or equal to a predetermined time.

According to another aspect of the disclosure, a vehicle includes a monitoring device including a camera for obtaining surrounding images, a tilting adjustor for adjusting a tilting angle of the camera; and an image display for displaying an image obtained from the camera; a storage configured to store information on an initial tilting angle of the camera; and a controller configured to control the tilting adjustor to adjust the tilting angle of the camera in response to determining that a brightness of a first image displayed on the image display is greater than or equal to a reference value, and after adjusting the tilting angle of the camera, control the tilting adjustor to adjust the tilting angle of the camera to an initial tilting angle in response to determining that a brightness of a second image displayed the image display is less than or equal to a release value.

The vehicle may further include an illuminance detector configured to detect illuminance and output illuminance information on the detected illuminance; wherein the controller may determine whether a current time is a day time or a night time based on the illuminance information, set the reference value as a first reference value and set the release value as a first release value in response to determining that the current time is the day time, and set the reference value as a second reference value and set the release value as a second release value in response to determining that the current time is the night time.

The controller may recognize a monitoring area in the first image of the image display, and determine whether a brightness of a pixel for each pixel of the monitoring area is greater than or equal to the reference value.

The controller may identify the number of pixels whose brightness is greater than or equal to the reference value among the pixels of the monitoring area, identify a ratio of an area in which the brightness of the pixel is greater than or equal to the reference value to the monitoring area based on the total number of pixels in the monitoring area and the number of identified pixels, and adjust the tilting angle of the camera in response to determining that the identified ratio is maintained to be greater than or equal to a first ratio for more than a predetermined time.

The controller may recognize the monitoring area in the second image of the image display, and determine whether a brightness of a pixel for each pixel of the monitoring area is less than or equal to the release value.

The controller may identify the number of pixels whose brightness is less than or equal to the release value among the pixels of the monitoring area, identify a ratio of an area in which the brightness of the pixel is less than or equal to the release value to the monitoring area based on the total number of pixels in the monitoring area and the number of identified pixels, and adjust the tilting angle of the camera to the initial tilting angle in response to determining that the identified ratio is maintained to be greater than or equal to a second ratio for more than a predetermined time.

The controller may recognize a monitoring area in the first image of the image display, and obtain the tilting angle of the camera based on position information of a corner of the first image and position information of a corner of the monitoring area.

The controller may recognize a lane in the first image of the image display and recognize the monitoring area based on position information of the recognized lane.

The monitoring area recognized in the first image and the monitoring area recognized in the second image may be the same as each other.

The vehicle may further include first and second doors provided on left and right sides of a body of the vehicle, respectively, wherein the camera of the monitoring device is provided in the first and second doors, respectively.

The vehicle may further include an inputter configured to receive a user input, and a seat whose position is adjusted, wherein the storage is configured to further store seat position information of the seat for each driver, and the controller may recognize a driver based on the user input received from the inputter, and obtain the tilting angle of the camera based on the seat position information corresponding to the recognized driver.

The controller may display notification information on adjustment of the tilting angle of the camera when adjusting the tilting angle of the camera.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 8 is a control flowchart illustrating a vehicle having a monitoring device according to an exemplary embodiment of the disclosure.

DETAILED DESCRIPTION

Figure 1:
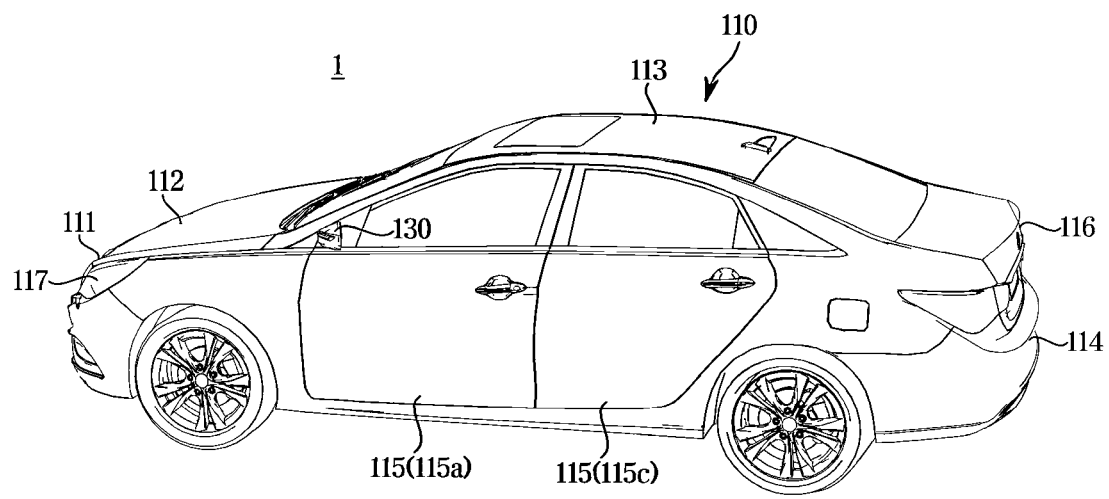
FIG. 1 is a view illustrating an exterior of a vehicle having a monitoring device according to an exemplary embodiment of the disclosure.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 2:
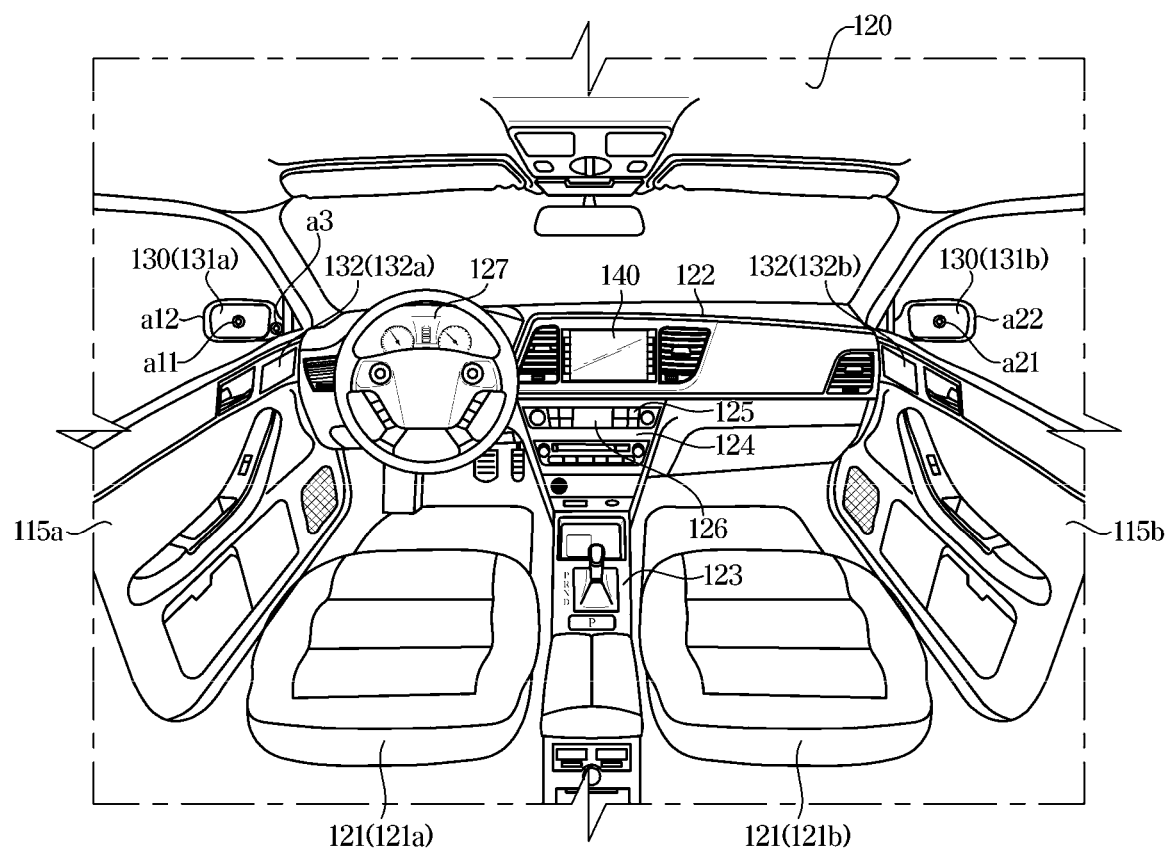
FIG. 2 is a view illustrating an interior of a vehicle having a monitoring device according to an exemplary embodiment of the disclosure.
Figure 3A:
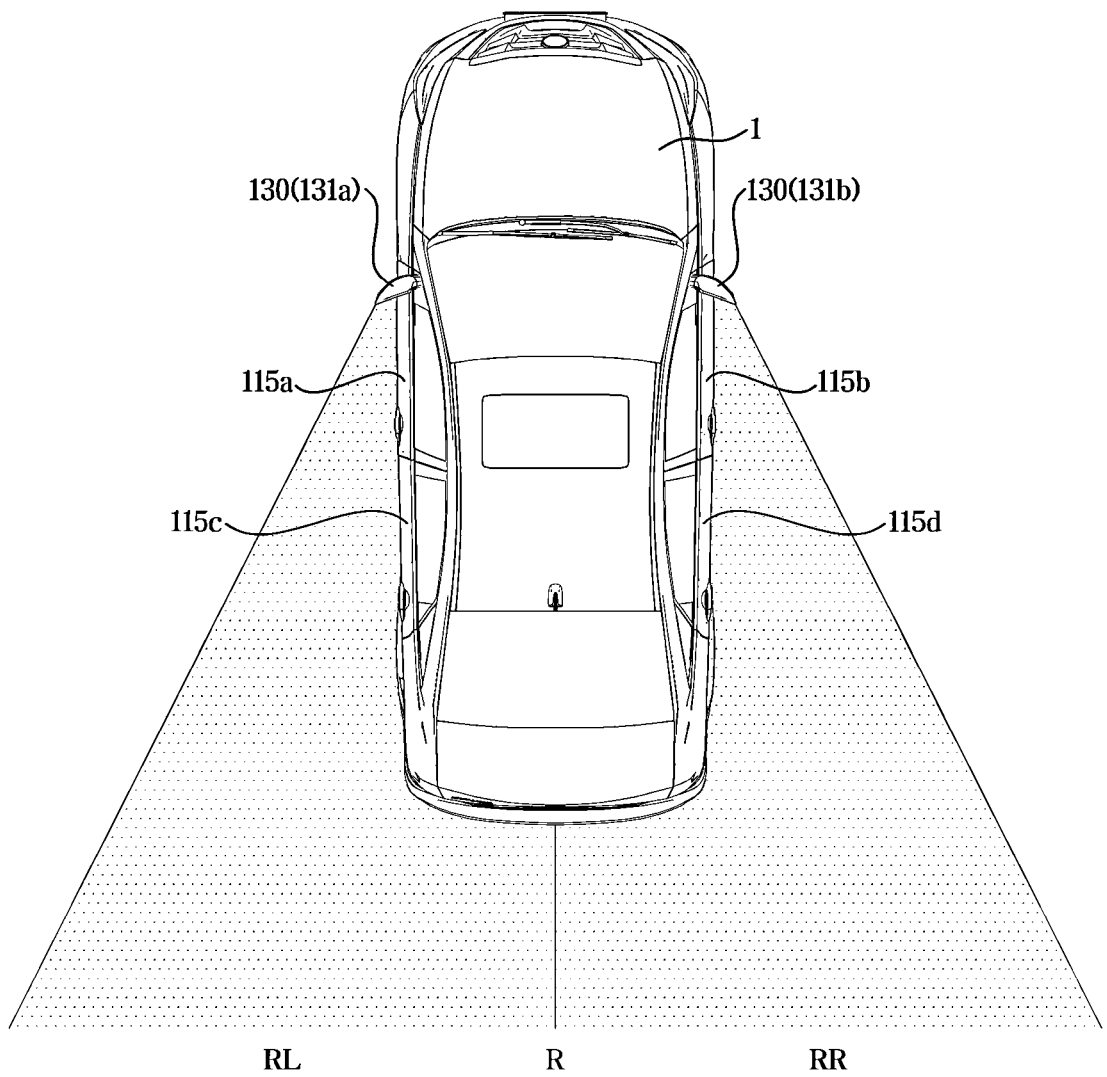
FIGS. 3A and 3B are views illustrating a position of an image obtainer of a monitoring device according to an exemplary embodiment of the disclosure.
Figure 3B:
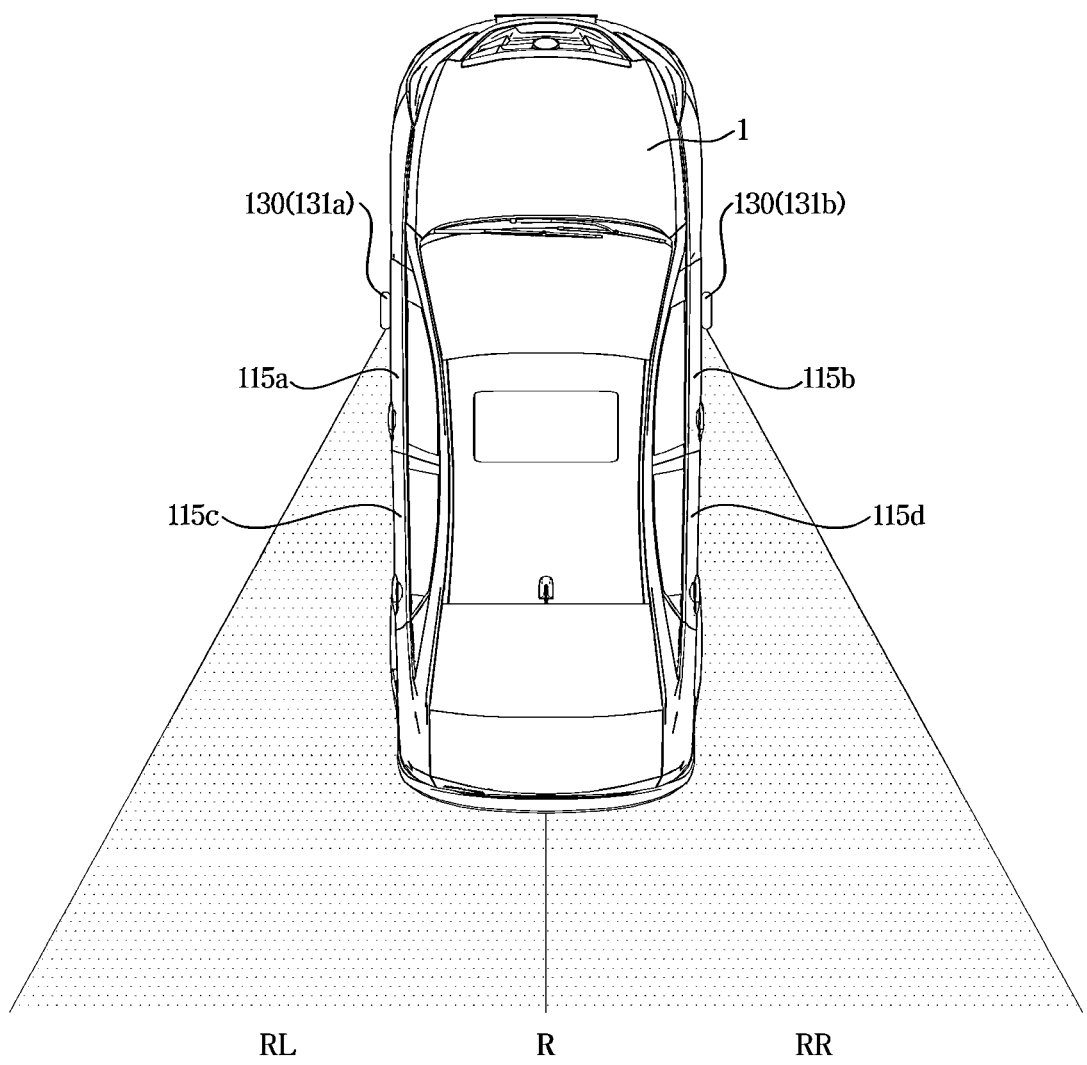

FIG. 1 is a view illustrating an exterior of a vehicle having a monitoring device according to an exemplary embodiment of the disclosure, and FIG. 2 is a view illustrating an interior of a vehicle having a monitoring device according to an exemplary embodiment of the disclosure. FIGS. 3A and 3B are views illustrating a position of an image obtainer of a monitoring device according to an exemplary embodiment of the disclosure.

As shown in FIG. 1, a vehicle 1 includes a body 110 having an exterior and an interior thereof, and a chassis in which mechanical components necessary for driving are installed as the remaining parts except for the body.

The exterior of the body 110 includes a front panel 111, a bonnet 112, a roof panel 113 and a rear panel 114, and a plurality of doors 115 for opening and closing an interior space where an occupant may sit, and further a plurality of window glasses provided on the plurality of doors, respectively.

Herein, the plurality of window glasses may include a side window glass, a quarter window glass installed between non-opening pillars, a rear window glass installed on a rear side of the vehicle, and a front window glass installed on a front side of the vehicle.

The vehicle 1 includes a tailgate 116 for opening and closing a trunk that forms a space for storing things, and a light capable of viewing easily of surrounding information while keeping an eye on a front view and performing signals and communication functions to other vehicles and pedestrians.

The doors 115 may be provided with an opening/closing member for opening and closing the door and a locking member for locking/unlocking the door.

As shown in FIG. 2, the interior 120 of the body of the vehicle includes a seat 121 on which an occupant sits, a dashboard 122, a center fascia 123 in which an air vent and a control plate of an air conditioner are arranged, and a head unit 124 that provided at the center fascia 123 and receives operation instructions of an audio device and the air conditioner.

The seat 121 may include a seat for a driver (a driver seat, 112a) on which the driver sits, and a seat for a passenger (a passenger seat, 112b) on which a (front) passenger sits, and may further include a rear passenger seat provided behind the driver seat and the passenger seat.

The vehicle 1 may further include an inputter 125 for receiving operation information of various functions.

The inputter 125 may be provided on the head unit 124 and/or the center fascia 126, may be provided on a steering wheel, and further may be provided on an armrest or a handle inside the door, and also provided each seat 121.

The inputter 125 may include at least one physical mechanisms such as turn on/off button for various functions, a button for changing a set value of various functions, a key, a switch, and the like.

The inputter 125 may further include a jog dial (not shown) or a touch pad (not shown) for inputting a movement command and a selection command of a cursor displayed on a terminal for the vehicle (e.g., Audio Video Navigation (AVN)). Herein, the jog dial or the touch pad may be provided on the center fascia 123 or the like.

The vehicle 1 may further include a display 126 that is provided in the head unit 124 and displays information about a function being performed in the vehicle and information input by a user.

The vehicle 1 may further include a cluster 127 disposed on the dashboard 122 and displaying driving information and state information of the vehicle.

The cluster 127 may selectively display a variety of images corresponding to an odometer, a tachograph, fuel economy, external temperature, internal temperature, stages of a shift lever, and a drivable distance.

The cluster 127 may further display door open information, further display information about obstacles in the surrounding, and further display information on abnormal tire pressure.

As shown in FIG. 3A, the plurality of doors 115 may include a door 115a of the driver side, a door 115b of the (front) passenger side, a door 115c of the rear left side, and a door 115d of the rear right side.

The vehicle 1 may further include first and second monitoring devices for providing the driver with a rear view, a rear left side view, and a rear right side view of the vehicle 1.

As shown in FIGS. 2 and 3A, the first monitoring device 130a includes a first image obtainer 131a provided on the door 115a of the driver side, and the second monitoring device 130b provided on the door 115b of the passenger side. In particular, the first monitoring device 130a is provided adjacent to a left A pillar and the side window glass of the driver side and provided to protrude from the door 115a by a predetermined length, and the second monitoring device 130b is provided adjacent to a right A pillar and the side window glass of the passenger side and provided to protrude by a predetermined length from the door 115b of the passenger side.

As shown in FIG. 2, the first monitoring device 130a further includes a first image display 132a for displaying a monitoring image obtained by the first image obtainer 131a, and the second monitoring device 130b may further include a second image display 132b for displaying a monitoring image obtained by the second image obtainer 131b.

As shown in FIG. 2, the first image display 132a may be provided on an inner side of the door 115a of the driver side, and the second image display 132b may be provided on an inner side of the door 115b of the passenger side.

Furthermore, the first and second image displays 132a and 132b may be provided on the dashboard 122 in the front of the driver seat. The first and second image displays 132a and 132b may be provided inside the built-in A-pillar.

The monitoring image obtained by the first image obtainer 131a and the monitoring image obtained by the second image obtainer 131b may be displayed through a vehicle terminal 140 provided in the vehicle. Herein, the vehicle terminal 140 may be the AVN device that performs audio, video, and navigation functions, and displays an image of the function being performed.

The first and second image displays 132a and 132b may be provided as a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, or an organic light emitting diode (OLED), and the like, but is not limited thereto.

As shown in FIG. 3B, the first image obtainer 131a of the first monitoring device 130a is provided on the door 115a of the driver side, and further the first image obtainer 131a is provided adjacent to a door handle of the driver side and provided to protrude from the door 115a of the driver side by a predetermined length. The second image obtainer 131b of the second monitoring device 130b is provided on the door 115b of the passenger side, and further the second image obtainer 131b is provided adjacent to a handle of the door 115b of the passenger side and provided to protrude by a certain length from the door 115b of the passenger side.

The first image obtainer 131a may include a first camera a11 and a first housing a12 for protecting the first camera a11, and further include a first folding member a113 for folding or unfolding the first housing a112.

The second image obtainer 131b may include a second camera a21 and a second housing a22 for protecting the second camera a21, and further include a second folding member a23 for folding or unfolding the second housing a22.

The first and second image obtainers 131a and 131b may be folded toward the door 115a and 115b (115) when an ignition of the vehicle is turned off, a remote controller deviates more than a predetermined distance, or a user input is received, and may be unfolded when the ignition is turned on, the remote controller approaches less than the predetermined distance, or the user input is received. In other words, the first and second image obtainers 131a and 131b may be automatically folded or unfolded in response to locking/unlocking of the door or turning on/off of the ignition.

The first and second folding members a13 and a23 of the first and second image obtainers 131a and 131b may include actuator (not shown) for folding and unfolding operations thereof. Herein, the actuator may include a motor.

Figure 4:
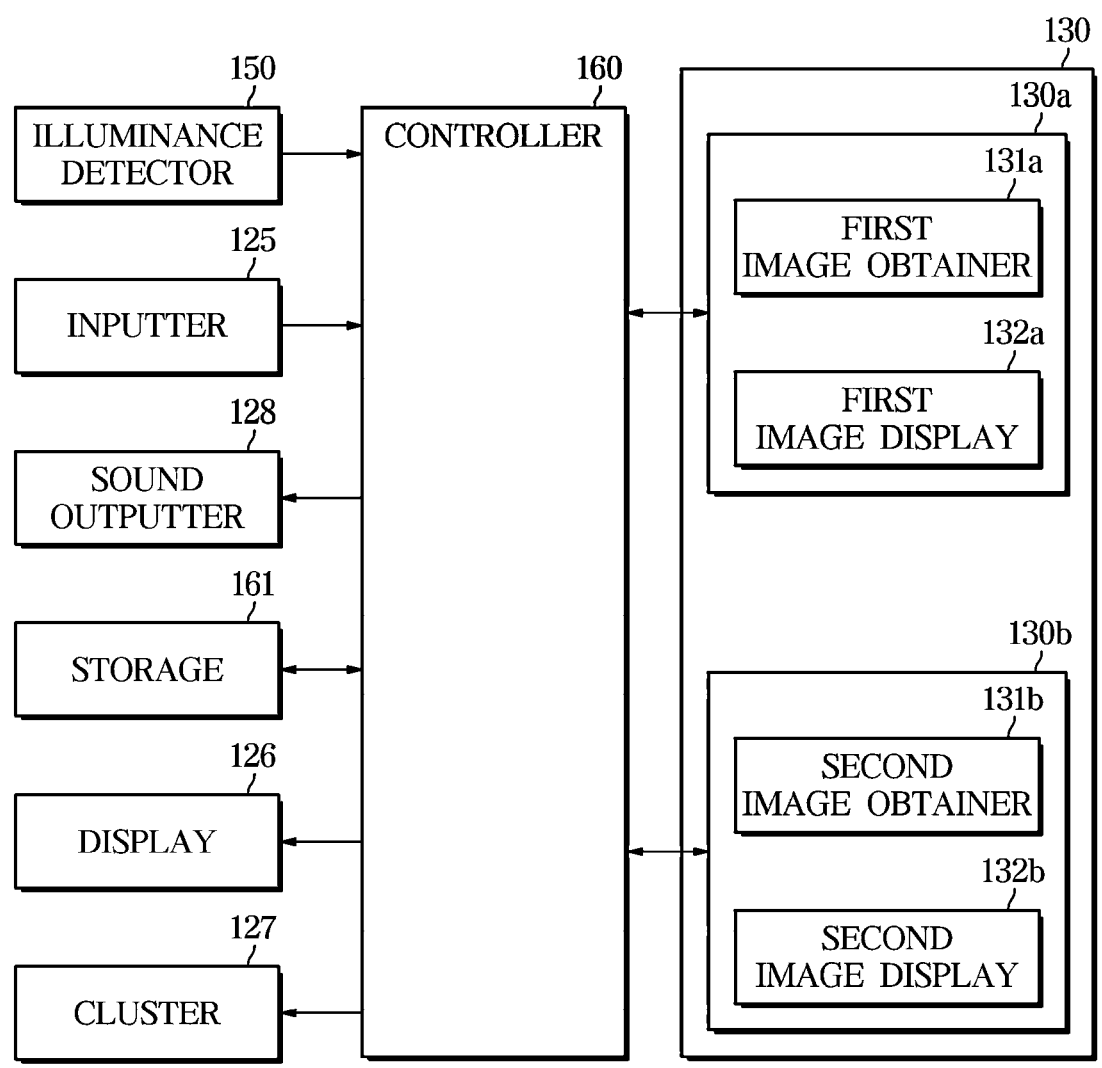
FIG. 4 is a control configuration diagram illustrating a vehicle having a monitoring device according to an exemplary embodiment of the disclosure.

The first and second cameras a11 and a21 of the first and second image obtainers 131a and 131b may obtain images of the rear view and rear lateral view of the vehicle and transmit the obtained the images to the controller 160 (refer to FIG. 4).

The first and second cameras a11 and a21 of the first and second image obtainers 131a and 131b may include a charge couple device (CCD) or a complementary metal-oxide-semiconductor (CMOS) image sensor.

The first and second cameras a11 and a21 of the first and second image obtainers 131a and 131b may include a three-dimensional space recognition sensor, such as KINECT (RGB-D sensor), TOF (Structured Light Sensor), stereo camera, and the like. The first and second cameras a11 and a21 of the first and second image obtainers 131a and 131b may include at least one rotatable camera.

The first and second cameras a11 and a21 of the first and second image obtainers 131a and 131b may be activated in response to a control instruction of the controller 160, which shown in FIG. 4, when the first and second image obtainers 131a and 131b are in an unfolded state.

Figure 5:
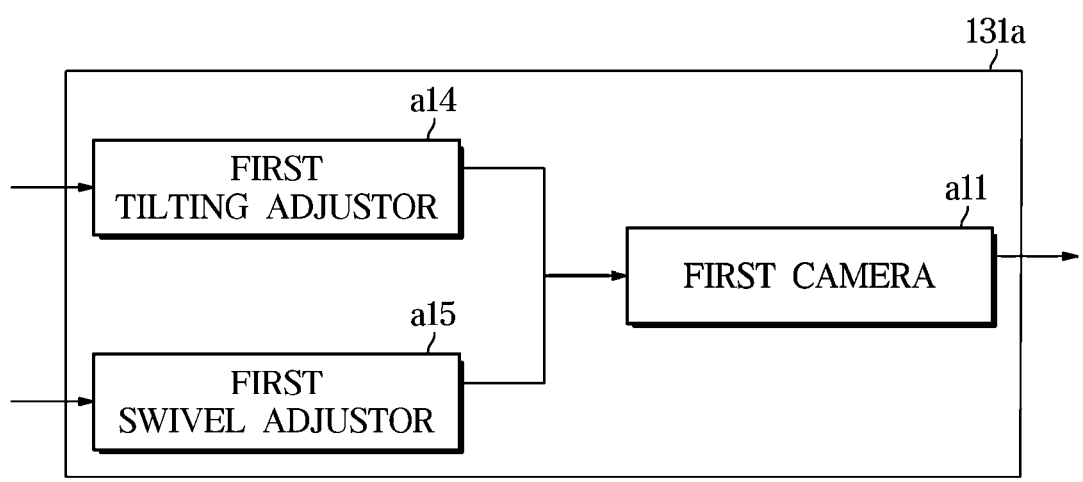
FIG. 5 is a configuration diagram illustrating a monitoring device according to an exemplary embodiment of the disclosure.
Figure 5:
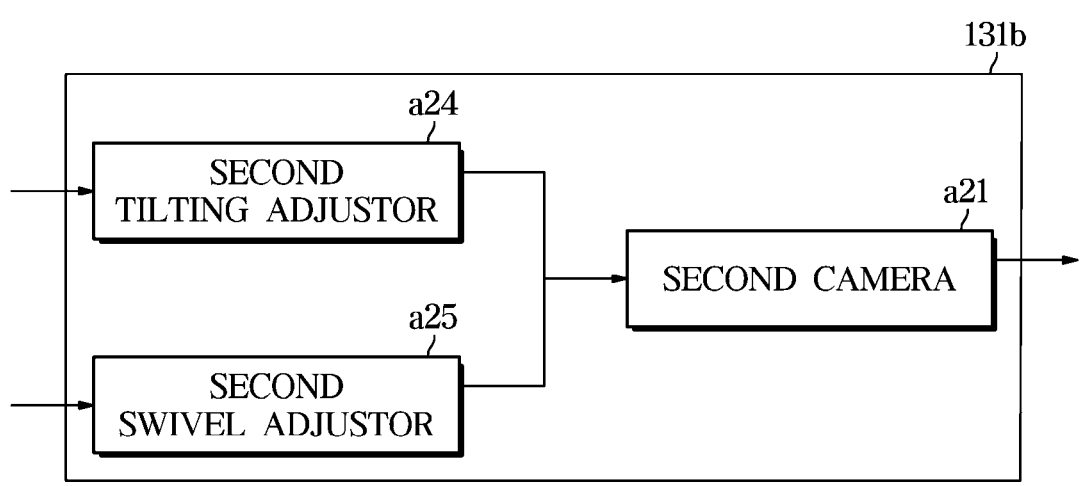

FIG. 4 is a control diagram illustrating a vehicle having a monitoring device according to an exemplary embodiment of the disclosure, and FIG. 5 is a configuration diagram illustrating a monitoring device according to an exemplary embodiment of the disclosure.

The vehicle 1 includes the inputter 125, the display 126, the cluster 127, a sound outputter (e.g., speaker) 128, a monitoring device 130, an illuminance detector 150, the controller 160, and a storage 161.

The inputter 125 receives a user input.

The inputter 125 may receive position information of the driver seat. Herein, position information of the seat may include front and rear position information, upper and lower position information, and angle information of the seat back.

The inputter 125 may receive identification information for the driver, and may receive angle information of the first and second image obtainers 131a and 131b corresponding to the identification information for the driver. Herein, the angle information of the first and second image obtainers 131a and 131b may include information on a tilting angle and a swivel angle.

The identification information for the driver may include at least one of a driver identification number, a driver name, a driver face image, a driver iris, a driver fingerprint, and a driver voice.

The display 126 displays the identification information for the driver, and may display the angle information of the first and second image obtainers 131a and 131b corresponding to the identification information for the driver, and also may display the position information of the seats 121a (121).

The cluster 127 may display the identification information for the driver, and may also display the angle information of the first and second image obtainers 131a and 131b corresponding to the identification information for the driver, and also may display the position information of the seats 121a (121).

The display 126 and the cluster 127 may display angle change information for at least one of the first and second monitoring devices in text in response to the occurrence of light saturation.

The vehicle may further include the sound outputter 128 that outputs information on a function being performed in the vehicle as a sound.

The sound outputter 128 may include one or more speakers.

The sound outputter 128 may output the angle change information for at least one of the first and second monitoring devices as sound. For example, the sound outputter 128 may output information indicating that the tilting angle of the first monitoring device is adjusted by satisfying a light saturation occurrence condition by voice, and may output information indicating that the tilting angle of the first monitoring device is adjusted to the initial tilting angle by satisfying a light saturation release condition by voice.

The monitoring device 130 may include first and second monitoring devices 130a and 130b (130) that provides the driver with the rear view, the rear left side view, and the rear right side view of the vehicle 1. Herein, each configuration of the first and second monitoring devices 130a and 130b may be the same as each other. The first and second monitoring devices 130a and 130b have been described with reference to FIGS. 2, 3A, and 3B, so a duplicate description thereof will be omitted.

As shown in FIG. 5, the first image obtainer 131a may further include a first tilting adjustor a14 for adjusting a vertical angle of the first camera a11 and a first swivel adjustor a15 for adjusting a horizontal angle of the first camera a11 within the first housing a12.

The second image obtainer 131b may further include a second tilting adjustor a24 for adjusting a up and down angles of the second camera a21 and a second swivel adjustor a25 for adjusting a left and right angles of the second camera a21.

The illuminance detector 150 detects illuminance around the monitoring device 130 or the vehicle 1 and transmits illuminance information on the detected illuminance to the controller 160.

The controller 160 controls activation of the monitoring device 130 in response to determining that the ignition of the vehicle is turned on.

The controller 160 recognizes the driver based on user information input to the inputter 125, identifies seat position information corresponding to the recognized driver based on the seat position information for each driver stored in the storage 161, and controls the position adjustment of the seat based on the seat position information.

The user information input to the inputter 125 may be an identification number for the driver or a driver name.

The controller 160 may also recognize the driver based on a face image obtained by an internal camera, a voice received by a microphone, or a fingerprint or iris.

The controller 160 identifies the angle information of the monitoring device 130 corresponding to the recognized driver based on the angle information of the monitoring device for each driver stored in the storage 161, and may adjust the tilting angle and the swivel angle of the first and second cameras provided in the first and second monitoring devices 130 based on the identified angle information.

The controller 160 determines whether current time is day time or night time based on the illuminance information transmitted from the illuminance detector 150, and identifies the light saturation occurrence condition and the light saturation release condition corresponding to the day time in response to determining the current time being the day time, and identifies the light saturation occurrence condition and the light saturation release condition corresponding to the night time in response to determining the current time being the night time.

Herein, information on the light saturation occurrence condition corresponding to the day time includes a first reference value and a predetermined first time, and information on the light saturation release condition includes a first release value and a predetermined second time. Information on the light saturation occurrence condition corresponds to the night time includes a second reference value and a predetermined third time, and information on the light saturation release condition includes a second release value and a predetermined fourth time.

The predetermined first, second, third, and fourth times may be the same as or different from each other. In this embodiment, it is assumed that the predetermined first, second, third, and fourth times are the same as each other. In other words, all of the first, second, third, and fourth predetermined times are described as the predetermined time.

The controller 160 may also predict the day time and the night time based on weather information, date information, and time information.

If the information on the light saturation occurrence condition and the information on the light saturation release condition for the day time and the night time are not set, respectively, the controller 160 may determine whether the images obtained by the first and second cameras based on the predetermined reference valve and release value is the light saturation occurrence condition or the light saturation release condition.

The controller 160 identifies brightness information for each area of the image obtained by the first camera a11, determines whether the light saturation occurrence condition is satisfied based on the identified brightness information for each area of the image, and adjusts the tilting angle of the first camera a11 in response to determining the light saturation occurrence condition being satisfied.

The controller 160 may recognize the monitoring area in the image obtained by the first camera, obtain the tilting angle based on the position information of the recognized monitoring area, and adjust the tilting angle of the first camera a11 to the obtained tilting angle.

The controller 160 may identify the tilting angle corresponding to the position information of the driver seat among the information stored in the storage 161 and adjust the tilting angle of the first camera a11 to the identified tilting angle.

The controller 160 identifies the brightness information of the image obtained by the first camera a11 after adjusting the tilting angle of the first camera a11, determines whether the light saturation release condition is satisfied or not based on the brightness information of the image obtained by the first camera a11, and adjusts the tilting angle of the first camera a11 to the initial tilting angle in response to determining the light saturation release condition being satisfied. Herein, the initial tilting angle may be a tilting angle of the first camera a11 predetermined corresponding to the recognized driver.

The controller 160 identifies the brightness information for each area of the image obtained by the second camera a21, determines whether the light saturation occurrence condition is satisfied or not based on the brightness information for each area of the identified image, and adjusts the tilting angle of the second camera a21 in response to determining the light saturation occurrence condition being satisfied.

The controller 160 may recognize the monitoring area in the image obtained by the second camera, obtains the tilting angle based on the position information of the recognized monitoring area, and adjust the tilting angle of the second camera a21 to the obtained tilting angle.

The controller 160 may also identify the tilting angle corresponding to the position information of the driver seat among the information stored in the storage 161, and adjust the tilting angle of the second camera a21 to the identified tilting angle.

The controller 160 identifies the brightness information of the image obtained by the second camera a21 after adjusting the tilting angle of the second camera a21, determines whether the light saturation release condition is satisfied or not based on the brightness information of the image obtained by the second camera a21, and adjusts the tilting angle of the second camera a21 to the initial tilting angle in response to determining the light saturation release condition being satisfied. Herein, the initial tilting angle may be a tilting angle of the second camera a21 predetermined corresponding to the recognized driver.

Configurations for adjusting the tilting angles of the first and second cameras a11 and a21 in response to the occurrence of light saturation in the monitoring images obtained through the first and second monitoring devices 130a and 130b may be the same as each other. Accordingly, for a detailed description of this configuration, a configuration for adjusting the tilting angle of the first camera a11 of the first monitoring device will be described as an example.

(1) Configuration of the controller that recognize the monitoring area will be described.

In response to determining that the ignition is turned on, the controller 160 controls the first tilting adjustor a14 so that the tilting angle of the first camera a11 is adjusted to the initial tilting angle, and then identifies the brightness information for each area of the first image obtained by the first camera a11. At this time, the controller 160 recognizes the monitoring area among a plurality of areas of the obtained first image, and identifies the brightness information of the recognized monitoring area.

Herein, the plurality of areas of the first image may be divided by pixels and may be divided by blocks having a predetermined size. In this embodiment, the plurality of areas divided by pixels will be described.

Figure 6:
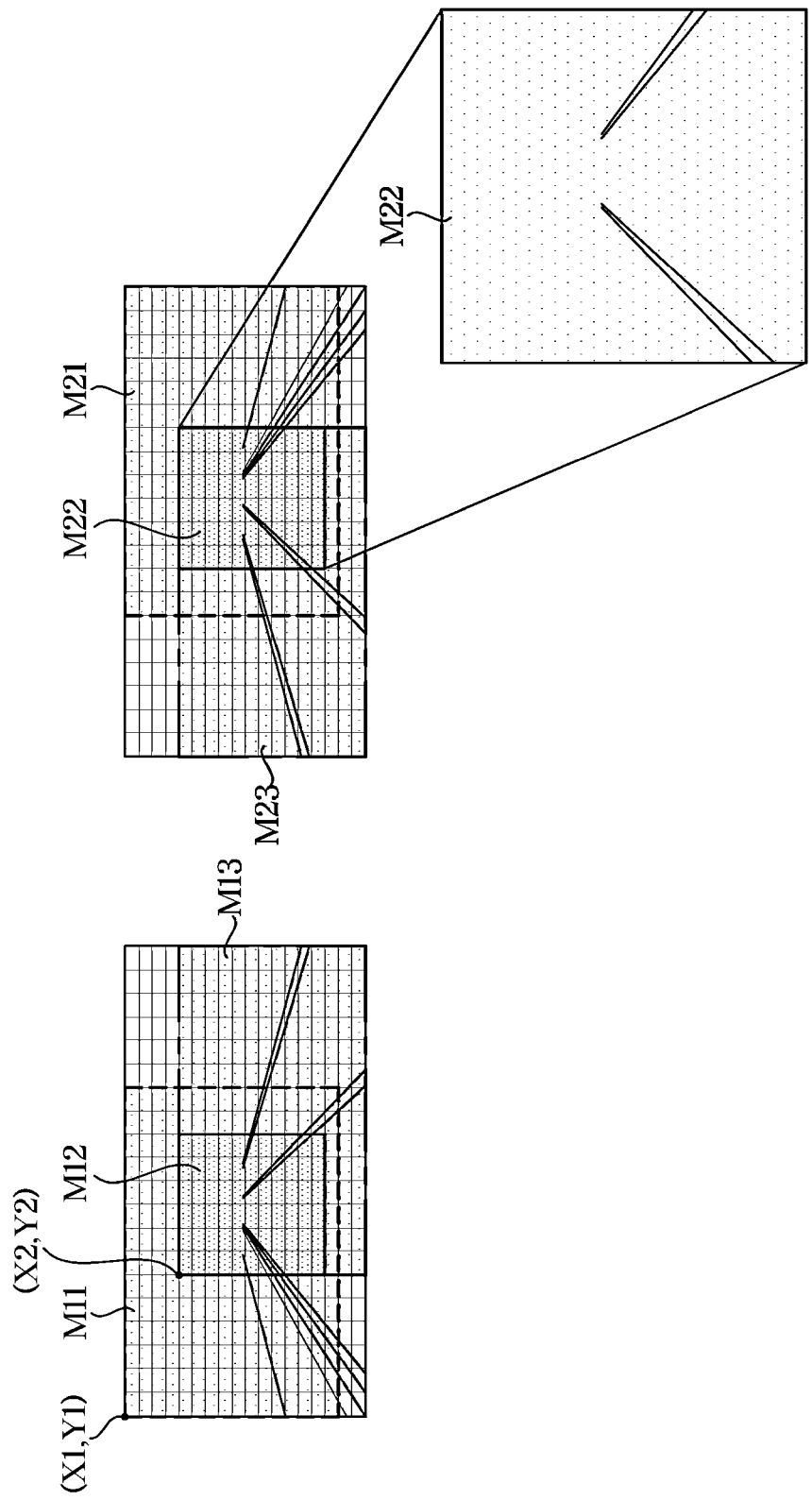
FIG. 6 is a view illustrating an image and a monitoring area obtained by a monitoring device according to an exemplary embodiment of the disclosure.

As shown in FIG. 6, when recognizing a first monitoring area M12 among the plurality of areas of a first image M11 obtained by the first camera, the controller 160 may recognize a lane in the obtained first image M11 and then recognize an area of a certain size including the recognized lane as the first monitoring area M12.

When recognizing a second monitoring area M22 among the plurality of areas of a first image M21 obtained from the second camera, the controller 160 may recognize a lane in the first image M21 obtained from the second camera and then recognize an area of a certain size including the recognized lane as the second monitoring area M22.

When recognizing respectively the monitoring area among the plurality of areas of the respective first images obtained by the first and second cameras, the controller 160 may recognize the lane in the respective first images and then recognize, in response to the recognized lanes are two, t an area of a certain size where the two lanes meet as each monitoring area.

The controller 160 may recognize an area including a left lane relative to its own lane on which the vehicle is traveling among the plurality of areas of the first image obtained by the first camera as the monitoring area. Herein, the area including the left lane may be an area including a lane on which other vehicles may travel.

The controller 160 may recognize an area including a right lane relative to its own lane on which the vehicle is traveling among the plurality of areas of the first image obtained by the second camera as the monitoring area. Herein, the area including the right lane may be an area including a lane on which other vehicles may travel.

(2) Configuration of the controller in the case where the information of the light saturation occurrence condition and the light saturation release condition information for the day time and the night time is not set, respectively, will be described.

The controller 160 may determine whether the brightness in the monitoring area is greater than or equal to the reference value based on the brightness information of the monitoring area among the plurality of areas in the first image, in response to determining the brightness in the monitoring area being greater than or equal to the reference value, obtain the tilting angle based on the position information of the monitoring area and adjust the tilting angle of the first camera a11 based on the obtained tilting angle. After adjusting the tilting angle of the first camera a11, the controller 160 may determine whether the brightness in the monitoring area is less than or equal to the release value based on the brightness information of the monitoring area, adjust the tilting angle of the first camera a11 to the initial tilting angle in response to determining the brightness in the monitoring area being less than or equal to the release value. Herein, the monitoring areas before and after the adjustment of the tilting angle may be identical to each other.

The controller 160 may determine whether the brightness of each pixel in the monitoring area in the first image is greater than or equal to the reference value or not, and may determine whether the brightness of each pixel in the monitoring area is less than or equal to the release value.

The controller 160 may determine whether the brightness of the pixel for each block in the monitoring area in the first image is greater than or equal to the reference value, and may determine whether the brightness of the pixel for each block in the monitoring area is less than or equal to the release value.

The controller 160 may identify the number of pixels whose brightness is greater than or equal to the reference value by comparing the brightness of each pixel of the monitoring area in the first image with the reference value, respectively, identify a ratio of an area in which the brightness of the pixel is greater than or equal to the reference value based on the total number of pixels in the monitoring area and the number of identified pixels, and adjust the tilting angle of the first camera a11 to the obtained tilting angle in response to determining that the ratio of the identified area is greater than or equal to a first ratio relative to the entire area of the monitoring area.

The controller 160 may identify the number of pixels whose brightness is less than or equal to the release value by comparing the brightness of each pixel of the monitoring area in the second image with the release value, respectively, identify a ratio of an area in which the brightness of the pixel is less than or equal to the release value based on the total number of pixels in the monitoring area and the number of identified pixels, and adjust the tilting angle of the first camera a11 to the initial tilting angle in response to determining that the ratio of the identified area is greater than or equal to a second ratio relative to the entire area of the monitoring area.

Herein, the brightness of each pixel may be a brightness value of each pixel for pixels.

The controller 160 may identify the number of pixels whose brightness is greater than or equal to the reference value by comparing the brightness of each pixel of the monitoring area in the first image with the reference value, respectively, identify the ratio of the area in which the brightness of the pixel is greater than or equal to the reference value based on the total number of pixels in the monitoring area and the number of determined pixels, and adjust the tilting angle of the first camera a11 to the obtained tilting angle in response to determining that the ratio of the identified area is maintained for a predetermined time greater than or equal to the first ratio relative to the entire area of the monitoring area.

The controller 160 may maintain the tilting angle of the first camera a11 to the initial tilting angle in response to determining that the time for which the ratio of the identified area is maintained greater than or equal to the first ratio relative to the entire area of the monitoring area is less than a predetermined time.

Figure 7A:
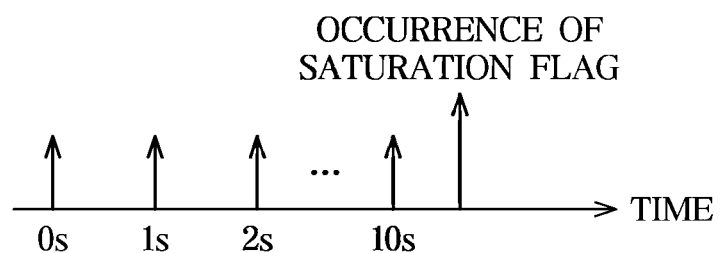
FIGS. 7A and 7B are views illustrating a generation of a saturation flag of a monitoring device according to an exemplary embodiment of the disclosure.

As shown in FIG. 7A, the controller 160 determines that the light saturation occurrence condition is primarily satisfied in response to determining that the ratio of the area in which the pixel brightness is greater than or equal to the reference value among the monitoring areas is greater than or equal to the first ratio, and in this case, occurring a saturation flag at a predetermined intervals. Furthermore, the controller 160 may determine that a predetermined time is maintained in response to determining that the occurred saturation flag is continuously occurred and the number of the continuously occurred saturation flags is greater than or equal to a predetermined number.

Herein, the predetermined intervals may be about 1 second, and the predetermined number may be about 10. In other words, the predetermined time may be about 10 seconds.

Figure 7B:
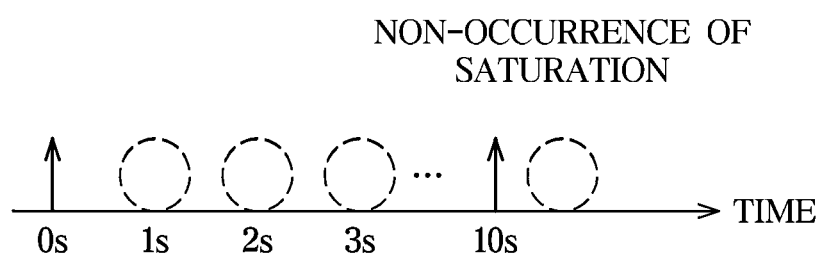

As shown in FIG. 7B, the controller 160 determines that the light saturation occurrence condition is primarily satisfied in response to the ratio of the area in which the pixel brightness is greater than or equal to the reference value among the monitoring area is greater than or equal to the first ratio, and in this time, occurring the saturation flag at the predetermined intervals. Furthermore, the controller 160 may determine that the predetermined time in not maintained in response to determining that the occurred saturation flag is discontinuously occurred or the number of the continuously occurred saturation flags is less than the predetermined number. In other words, in response to determining that the predetermined time is not maintained even if the ratio of the area in which the brightness is greater than or equal to the reference value among the monitoring areas is greater than or equal to the first ratio, the controller 160 determines that the light saturation occurrence condition is not finally satisfied.

The controller 160 may identify the number of pixels whose brightness is less than or equal to the release value by comparing the brightness of each pixel of the monitoring area in the second image with the release value, respectively, identify the ratio of the area in which the brightness of the pixel is less than or equal to the release value based on the total number of pixels in the monitoring area and the number of identified pixels, and adjust the tilting angle of the first camera a11 to the initial tilting angle in response to determining that the ratio of the identified area is maintained for the predetermined time greater than or equal to the second ratio relative to the entire area of the monitoring area.

The controller 160 may maintain the tilting angle of the first camera a11 to the obtained tilting angle in response to determining that the time for which the ratio of the identified area is maintained greater than or equal to the second ratio relative to the entire area of the monitoring area is less than a predetermined time.

(3) The configuration of controller when information on the light saturation occurrence conditions and information on the light saturation release conditions for the day time and the night time are respectively set will be described.

In response to determining that the current time is the day time, the controller 160 determines whether the brightness in the monitoring area is greater than or equal to the first reference value based on the brightness information of the monitoring area of the image obtained by the first camera, and in response to determining that the brightness in the monitoring area is greater than or equal to the first reference value, the controller 160, obtains the tilting angle based on the position information of the monitoring area and adjust the tilting angle of the first camera a11 based on the obtained tilting angle. After adjusting the tilting angle of the first camera a11, the controller 160 determines whether the brightness in the monitoring area is less than or equal to the first release value based on the brightness information of the monitoring area, and in response to determining that the brightness in the monitoring area is less than or equal to the first release value, may adjust the tilting angle of the first camera a11 to the initial tilting angle.

In response to determining that the current time is the day time, the controller 160 may determine whether the brightness of the pixel for each pixel of the monitoring area in the image is greater than or equal to the first reference value, and determine whether the brightness of the pixel for each pixel of the monitoring area is less than or equal to the first release value.

In response to determining that the current time is the day time, the controller 160 may identify the number of pixels whose brightness is greater than or equal to the first reference value by comparing the brightness of each pixel of the monitoring area in the first image with the first reference value, respectively, identify the ratio of the area in which the brightness of the pixel is greater than or equal to the first reference value based on the total number of pixels in the monitoring area and the number of identified pixels, and adjust the tilting angle of the first camera a11 to the obtained tilting angle in response to determining that the ratio of the identified area is greater than or equal to a first ratio relative to the entire area of the monitoring area.

In response to determining that the current time is the day time, the controller 160 may identify the number of pixels whose brightness is less than or equal to the first release value by comparing the brightness of each pixel of the monitoring area in the second image with the first release value, respectively, identify the ratio of the area in which the brightness of the pixel is less than or equal to the first release value based on the total number of pixels in the monitoring area and the number of identified pixels, and adjust the tilting angle of the first camera a11 to the initial tilting angle in response to determining that the ratio of the determined area is greater than or equal to a second ratio relative to the entire area of the monitoring area.

In response to determining that the current time is the day time, the controller 160 may identify the number of pixels whose brightness is greater than or equal to the first reference value by comparing the brightness of each pixel of the monitoring area in the first image with the first reference value, respectively, identify the ratio of the area in which the brightness of the pixel is greater than or equal to the first reference value based on the total number of pixels in the monitoring area and the number of identified pixels, and adjust the tilting angle of the first camera a11 to the obtained tilting angle in response to determining that the ratio of the identified area is maintained for the predetermined time greater than or equal to the first ratio relative to the entire area of the monitoring area.

In response to determining that the current time is the day time, the controller 160 may identify the number of pixels whose brightness is less than or equal to the first release value by comparing the brightness of each pixel of the monitoring area in the second image with the first release value, respectively, identify the ratio of the area in which the brightness of the pixel is less than or equal to the first release value based on the total number of pixels in the monitoring area and the number of identified pixels, and adjust the tilting angle of the first camera a11 to the initial tilting angle in response to determining that the ratio of the determined area is maintained for the predetermined time greater than or equal to the second ratio relative to the entire area of the monitoring area.

In response to determining that the current time is the night time, the controller 160 determines whether the brightness in the monitoring area is greater than or equal to the second reference value based on the brightness information of the monitoring area of the first image obtained by the first camera, and in response to determining that the brightness in the monitoring area is greater than or equal to the second reference value, obtains the tilting angle based on the position information of the monitoring area and adjusts the tilting angle of the first camera a11 based on the obtained tilting angle. After adjusting the tilting angle of the first camera a11, the controller 160 determines whether the brightness in the monitoring area is less than or equal to the second release value based on the brightness information of the monitoring area of the second image, and in response to determining that the brightness in the monitoring area is less than or equal to the second release value, may adjust the tilting angle of the first camera a11 to the initial tilting angle.

In response to determining that the current time is the night time, the controller 160 may identify the number of pixels whose brightness is greater than or equal to the second reference value by comparing the brightness of each pixel of the monitoring area in the first image with the second reference value, respectively, identify the ratio of the area in which the brightness of the pixel is greater than or equal to the second reference value based on the total number of pixels in the monitoring area and the number of identified pixels, and adjust the tilting angle of the first camera a11 to the obtained tilting angle in response to determining that the ratio of the identified area is greater than or equal to the first ratio relative to the entire area of the monitoring area in the first image.

In response to determining that the current time is the night time, the controller 160 may identify the number of pixels whose brightness is less than or equal to the second release value by comparing the brightness of each pixel of the monitoring area in the second image with the second release value, respectively, identify the ratio of the area in which the brightness of the pixel is less than or equal to the second release value based on the total number of pixels in the monitoring area and the number of identified pixels, and adjust the tilting angle of the first camera a11 to the initial tilting angle in response to determining that the ratio of the identified area is greater than or equal to a second ratio relative to the entire area of the monitoring area in the second image.

In response to determining that the current time is the night time, the controller 160 may identify the number of pixels whose brightness is greater than or equal to the second reference value by comparing the brightness of each pixel of the monitoring area in the first image with the second reference value, respectively, identify the ratio of the area in which the brightness of the pixel is greater than or equal to the second reference value based on the total number of pixels in the monitoring area and the number of identified pixels, and adjust the tilting angle of the first camera a11 to the obtained tilting angle in response to determining that the ratio of the identified area is maintained for the predetermined time greater than or equal to the first ratio relative to the entire area of the monitoring area in the first image.

In response to determining that the current time is the night time, the controller 160 may identify the number of pixels whose brightness is less than or equal to the second release value by comparing the brightness of each pixel of the monitoring area in the second image with the second release value, respectively, identify the ratio of the area in which the brightness of the pixel is less than or equal to the second release value based on the total number of pixels in the monitoring area and the number of identified pixels, and adjust the tilting angle of the first camera a11 to the initial tilting angle in response to determining that the ratio of the determined area is maintained for the predetermined time greater than or equal to the second ratio relative to the entire area of the monitoring area in the second image.

(4) Configuration of the controller for obtaining the tilting angle of the first camera will be described.

As shown in FIG. 6, when adjusting the tilting angle of the first camera a11 to the obtained tilting angle, the controller 160 may obtain the tilting angle that allows the image of the monitoring area M12 to be included in the second image M13 obtained by the first camera whose tilting angle is adjusted, and control the first tilting adjustor a14 of the first camera with the obtained tilting angle.

When adjusting the tilting angle of the second camera a21 to the obtained tilting angle, the controller 160 may obtain the tilting angle that allows the image of the monitoring area M22 to be included in the second image M23 obtained by the second camera whose tilting angle is adjusted, and control the second tilting adjustor a24 of the second camera with the obtained tilting angle.

The controller 160 may identify position information of a corner of the first image M11 obtained by the first camera a11, obtain position information of a corner of the monitoring area M12 in the first image, and obtain the tilting angle of the first camera a11 based on the position information of the corner of M12 and the position information of the corner of the first image M11.

The controller 160 may obtain the tilting angle of the first camera based on the position information of the corner corresponding to each other among the corners of the monitoring area and the corners of the first image.

For example, as shown in FIG. 6, the controller 160 obtains the tilting angle of the first camera based on the position information X1 and Y1 of an upper left corner among the corners of the first image M11 and the position information X2 and Y2 of an upper left corner among the corners of the monitoring area M12, and may obtain the tilting angle based on a difference in Y-axis values so as to adjust a tilting angle that is an upper, middle, and lower angle of the first camera.

Herein, information on the tilting angle corresponding to the difference in the Y-axis values may be information obtained by an experiment and stored in advance.

As shown in FIG. 6, the controller 160 may obtain the tilting angle of the first camera such that the upper left corner of the monitoring area matches the upper left corner of the second image M13.

The controller 160 may obtain the swivel angle of the first camera based on the position information of the corner corresponding to each other among the corners of the monitoring area and the corners of the first image, and control the first swivel adjustor a115 so as to adjust the swivel angle of the first camera based on the obtained swivel angle.

The controller 160 may be implemented as a memory (not shown) that stores data for algorithms for controlling operations of components in the vehicle or programs that reproduces the algorithms, and a processor (not shown) that performs the above-described operations using the data stored in the memory. In this case, the memory and the processor may be implemented as separate chips. Alternatively, the memory and the processor may be implemented as a single chip.

The storage 161 may store the reference value for determining the light saturation occurrence condition and the release value for determining the light saturation release condition.

Furthermore, the storage 161 may store the first reference value and the first release value corresponding to the day time, and store the second reference value and the second release value corresponding to the night time.

Herein, the first reference value and the second reference value may be information on the light saturation occurrence condition, and the first release value and the second release value may be information on the light saturation release condition.

The first reference value is a value in a state in which an object in an area in which the light saturation may occur among areas of the image obtained in the day time may not be recognized, and the second reference value is a value in a state in which the object in the area in which the light saturation may occur among the areas of the image obtained in the night time may not be recognized.

Herein, the object may include a lane.

The first release value is a value in which an object in an area in which the light saturation is to be recognized among the areas of the image obtained during the day time begins to difficult to recognize, and the second reference value is a value in which the object in the area in which the light saturation is to be recognized among the areas of the image obtained during the night time begins to difficult to recognize.

The area in which the light saturation is to be recognized among the areas of the image obtained by the camera may an area in which the lane is recognized, which is the monitoring area.

The first and second reference values and the first and second release values may vary depending on a position and performance of the first and second cameras, and may be predetermined information obtained through a test.

The storage 161 may store the first ratio as information on the light saturation occurrence condition for determining the light saturation occurrence condition, and store the second ratio as information on the light saturation release condition for determining the light saturation release condition.

The first and second ratios may vary depending on the types of vehicle, the position and performance of the first and second cameras, and may be information obtained through the test to set in advance. For example, the first ratio may be about 70%, and the second ratio may be about 50%.

The storage 161 may store the predetermined time for determining the light saturation occurrence condition. Herein, the predetermined time may vary depending on the types of vehicle, the position and performance of the first and second cameras, and may be the predetermined information obtained through the test to set in advance. For example, the predetermined time is a time for which the light saturation occurrence condition is maintained, and may be about 10 seconds.

The storage 161 may store information on the tilting angle corresponding to the difference in Y-axis values, and may store information on the swivel angle corresponding to a difference in X-axis values.

The storage 161 may also store the information on the tilting angle to be adjusted in the light saturation occurrence condition for each driver.

The storage 161 may store weather information, date information, and night and day information corresponding to time information.

The storage 161 may store user information for each user, seat position information for each user, and angle information of the first and second monitoring devices for each user. Herein, the user may be a driver.

The storage 161 may be a memory implemented as a chip separate from the processor described above related to the controller 160, or may be implemented as a single chip with the processor.

The storage 161 may be implemented as at least one of a nonvolatile memory device such as a cache, a read only memory (ROM), a programmable ROM (PROM), an erasable programmable ROM (EPROM), an electrically erasable programmable ROM (EEPROM), and flash memory, or a volatile memory device such as a random access memory (RAM), or a storage medium such as a hard disk drive (HDD), a compact disk (CD-ROM), but is not limited thereto.

Each component shown in FIG. 4 may refers to software and/or hardware components such as a field programmable gate array (FPGA) and an application specific integrated circuit (ASIC).

At least one component may be added or deleted corresponding to the performance of the components of the vehicle illustrated in FIG. 4. Furthermore, it will be readily understood by those of ordinary skill in the art that mutual positions of the components may be changed corresponding to the performance or structure of the system.

FIG. 8 is a control flowchart illustrating a vehicle having a monitoring device according to an exemplary embodiment of the disclosure.

When the vehicle is started, the vehicle recognizes the driver (in operation 201), identifies seat position information corresponding to the recognized driver based on the seat position information for each driver stored in the storage 161, and controls the position adjustment of the seat based on the seat position information (in operation 202). The vehicle identifies the angle information of the first and second cameras corresponding to the recognized driver, and adjusts the tilting angles and the swivel angles of the first and second cameras based on the identified the angle information of the first and second cameras (in operation 203).

Herein, the angle information of the first and second cameras is the information on the tilting angles and swivel angles of the first and second cameras. In other words, the adjusted tilting angles and the swivel angles of the first and second cameras may be the initial tilting angles and the initial swivel angles.

The vehicle detects the illuminance using the illuminance detector (in operation 204), determines whether the current time is the day time or the night time based on the detected illuminance information on the detected illuminance, in response to determining that the current time is the day time sets the first reference value as the light saturation occurrence condition and set the first release value as the light saturation release condition, and in response to determining that the current time is the night time sets the second reference value as the light saturation occurrence condition and the second release value as the light saturation release condition. In other words, the vehicle sets reference values and release values for adjusting the tilting angles of the first and second cameras in response to light saturation (in operation 205).

Configurations for adjusting the tilting angles of the first and second cameras a11 and a21 in response to the occurrence of light saturation in the images obtained through the first and second monitoring devices 130a and 130b may be identical to each other. Therefore, for a detailed description of this configuration, a configuration for adjusting the tilting angle of the first camera a11 of the first monitoring device will be described as an example.

The vehicle recognizes a lane in the first image obtained by the first camera of the first monitoring device and recognizes the monitoring area based on the position information of the recognized lane in the first image (in operation 206).

Furthermore, when recognizing the monitoring area among the plurality of areas of the obtained first image, the vehicle may recognize the lane in the obtained first image, and if the recognized lanes are two the vehicle may recognize the area where the two lanes meet as the monitoring area.

The vehicle may recognize the area including a left lane relative to the own lane on which the vehicle is traveling among the plurality of areas of the obtained first image as the monitoring area. Herein, the area including the left lane may be an area including a lane on which other vehicles may travel.

Next, the vehicle determines whether the monitoring area in the first image satisfies the light saturation occurrence condition (in operation 207).

More specifically, the vehicle may identify the number of pixels whose brightness is greater than or equal to the reference value by comparing the brightness of each pixel of the monitoring area in the first image with the reference value, respectively, identify the ratio of the area in which the brightness of the pixel is greater than or equal to the reference value based on the total number of pixels in the monitoring area and the number of identified pixels, and identify the time maintained greater than or equal to the first ratio in response to determining that the ratio of the identified area is greater than or equal to the first ratio relative to the entire area of the monitoring area in the first image, and determine that the monitoring area in the first image satisfies the light saturation occurrence condition in response to determining that the identified time is greater than or equal to the predetermined time.

Herein, the reference value may be the first reference value when the current time is the day time, and may be the second reference value when the current time is the night time.

Meanwhile, the vehicle determines that the monitoring area in the first image does not satisfy the light saturation occurrence condition in response to determining that the ratio of the area whose brightness is greater than or equal to the reference value is less than the first ratio relative to the entire area of the monitoring area, or that the time maintained greater than or equal to the first ratio is less than a predetermined time.

In response to determining that the monitoring area in the first image does not satisfy the light saturation occurrence condition, the vehicle maintains the tilting angle of the first camera to the initial tilting angle.

The vehicle may identify the position information of the corner of the first image obtained by the first camera a11, obtain the position information of the corner of the monitoring area in the first image, and obtain the tilting angle of the first camera a11 based on the position information of the corner of the monitoring area M12 and the position information of the corner of the first image.

In other words, the vehicle may obtain the tilting angle of the first camera based on position information of the corner corresponding to each other among the corners of the monitoring area and the corners of the first image.

As shown in FIG. 6, the vehicle obtains the tilting angle of the first camera based on the position information X1 and Y1 of the upper left corner among the corners of the first image and the position information X2 and Y2 of the upper left corner among the corners of the monitoring area, and may obtain the tilting angle based on the difference in Y-axis values to adjust the tilting angle that is an upper, middle, and lower angle of the first camera (in operation 208).

Next, the vehicle adjusts the tilting angle of the first camera a11 to the obtained tilting angle (in operation 209).

The vehicle may display notification information on adjustment of the tilting angle of the first camera as an image through at least one of the display, the image display, or the cluster.

The vehicle may output the notification information on the adjustment of tilting angle of the first camera as a sound through the sound outputter.

Next, after adjusting the tilting angle of the first camera to the obtained tilting angle, the vehicle determines whether the monitoring area in the second image obtained by the first camera satisfies the light saturation release condition (in operation 210).

More specifically, the vehicle may identify the number of pixels whose brightness is less than or equal to the release value by comparing the brightness of each pixel of the monitoring area in the second image obtained by the first camera with the release value, respectively, identify the ratio of the area in which the brightness of the pixel is less than or equal to the release value based on the total number of pixels in the monitoring area and the number of identified pixels, and identify the time maintained greater than or equal to the second ratio in response to determining that the ratio of the identified area is greater than or equal to the second ratio relative to the entire area of the monitoring area in the second image, and determines that the monitoring area in the second image satisfies the light saturation release condition in response to determining that the identified time is greater than or equal to the predetermined time.

Herein, the release value may be the first release value when the current time is the day time, and may be the second release value when the current time is the night time. At this time, the vehicle adjusts the tilting angle of the first camera a11 to the initial tilting angle (in operation 211).

The vehicle determines that the monitoring area in the second image does not satisfy the light saturation release condition in response to determining that the ratio of the identified area is less than the second ratio relative to the entire area of the monitoring area in the second image, or the time maintained greater than or equal to the second ratio is less than the predetermined time.

In this case, the vehicle may maintain the tilting angle of the first camera a11 to the obtained tilting angle.

As is apparent from the above, according to embodiments of the disclosure may provide the driver with a view of the rear side and a view of rear lateral of the vehicle with a wide angle of view (around 35 degrees) compared to the angle of view of the side mirror (around 17 degrees), so that the driver may accurately recognize surrounding situations without shoulder check, and check the blind spots.

Furthermore, the embodiments of the disclosure may provide the driver with a clear image of the surrounding situations in real time even in bad weather. Because embodiments of the disclosure provides a clear image of the surrounding situation without an additional device, leading to preventing an increase in cost and promoting safety of driving.

The embodiments of the disclosure allows to receive less air resistance in an aerodynamic section compared to the side mirrors, thereby reducing wind noise.

As described above, embodiments of the disclosure may improve the quality and marketability of the monitoring device and vehicle, further improve a user convenience and a vehicle safety, and secure product competitiveness.

On the other hand, embodiments of the disclosure may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A monitoring device, comprising:
a camera for obtaining an image;
an image display for displaying the image;
a housing for protecting the camera;
a tilting adjustor disposed inside the housing and connected to the camera so that the camera moves vertically, and configured to adjust a tilting angle of the camera; and
a controller configured to:
recognize a brightness of a first image displayed on the image display,
control the tilting adjustor to adjust the tilting angle of the camera in response to determining that the recognized brightness is greater than or equal to a reference value, and
after adjusting the tilting angle of the camera, control the tilting adjustor to adjust the tilting angle of the camera to an initial tilting angle in response to determining that a brightness of a second image displayed the image display is less than or equal to a release value.

2. The monitoring device of claim 1, further comprising an illuminance detector configured to detect illuminance and output illuminance information on the detected illuminance, wherein
the controller is further configured to:
determine whether a current time is a day time or a night time based on the illuminance information,
set the reference value as a first reference value and set the release value as a first release value in response to determining that the current time is the day time, and
set the reference value as a second reference value and set the release value as a second release value in response to determining that the current time is the night time.

3. The monitoring device of claim 1, wherein the controller is further configured to recognize a monitoring area in the first image, and to determine whether a brightness of a pixel for each pixel of the recognized monitoring area is greater than or equal to the reference value.

4. The monitoring device of claim 3, wherein the controller is further configured to:
identify the number of pixels whose brightness is greater than or equal to the reference value among pixels of the monitoring area,
identify a ratio of an area in which the brightness of the pixel is greater than or equal to the reference value to the monitoring area based on a total number of the pixels in the monitoring area and the identified number of pixels, and
adjust the tilting angle of the camera in response to determining that the identified ratio is greater than or equal to a first ratio.

5. The monitoring device of claim 4, wherein the controller is further configured to control the tilting adjustor so that the tilting angle of the camera is adjusted in response to determining that a time for maintaining the identified ratio greater than or equal to the first ratio is greater than or equal to a predetermined time.

6. The monitoring device of claim 1, wherein the controller is further configured to recognize a monitoring area in the second image, and to determine whether a brightness of a pixel for each pixel of the recognized monitoring area is less than or equal to the release value.

7. The monitoring device of claim 6, wherein the controller is further configured to:
identify the number of pixels whose brightness is less than or equal to the release value among pixels of the monitoring area,
identify a ratio of an area in which the brightness of the pixel is less than or equal to the release value to the monitoring area based on a total number of the pixels in the monitoring area and the identified number of pixels, and
adjust the tilting angle of the camera to the initial tilting angle in response to determining that the identified ratio is greater than or equal to a second ratio.

8. The monitoring device of claim 7, wherein the controller is further configured to control the tilting adjustor so that the tilting angle of the camera is adjusted to the initial tilting angle in response to determining that a time for maintaining the identified ratio greater than or equal to the second ratio is greater than or equal to a predetermined time.

9. A vehicle, comprising:
a monitoring device including a camera for obtaining surrounding images;
a housing for protecting the camera;
a tilting adjustor disposed inside the housing and connected to the camera so that the camera moves vertically, and configured to adjust a tilting angle of the camera;
an image display for displaying an image obtained from the camera;
a storage configured to store information on an initial tilting angle of the camera; and
a controller configured to:
control the tilting adjustor to adjust the tilting angle of the camera in response to determining that a brightness of a first image displayed on the image display is greater than or equal to a reference value, and
after adjusting the tilting angle of the camera, control the tilting adjustor to adjust the tilting angle of the camera to an initial tilting angle in response to determining that a brightness of a second image displayed the image display is less than or equal to a release value.

10. The vehicle of claim 9, further comprising an illuminance detector configured to detect illuminance and to output illuminance information on the detected illuminance, wherein
the controller is further configured to:
determine whether a current time is a day time or a night time based on the illuminance information,
set the reference value as a first reference value and set the release value as a first release value in response to determining that the current time is the day time, and
set the reference value as a second reference value and set the release value as a second release value in response to determining that the current time is the night time.

11. The vehicle of claim 9, wherein the controller is further configured to recognize a monitoring area in the first image of the image display, and determine whether a brightness of a pixel for each pixel of the monitoring area is greater than or equal to the reference value.

12. The vehicle of claim 11 wherein the controller is further configured to:
- identify the number of pixels whose brightness is greater than or equal to the reference value among pixels of the monitoring area,
- identify a ratio of an area in which the brightness of the pixel is greater than or equal to the reference value to the monitoring area based on a total number of the pixels in the monitoring area and the identified number of pixels, and
- control the tilting adjustor so that the tilting angle of the camera is adjusted in response to determining that a time for maintaining the identified ratio greater than or equal to a first ratio is greater than or equal to a predetermined time.

13. The vehicle of claim 9, wherein the controller is further configured to recognize a monitoring area in the second image of the image display, and to determine whether a brightness of a pixel for each pixel of the monitoring area is less than or equal to the release value.

14. The vehicle of claim 13, wherein the controller is further configured to:
- identify the number of pixels whose brightness is less than or equal to the release value among pixels of the monitoring area,
- identify a ratio of an area in which the brightness of the pixel is less than or equal to the release value to the monitoring area based on a total number of the pixels in the monitoring area and the identified number of pixels, and
- adjust the tilting angle of the camera to the initial tilting angle in response to determining that the identified ratio is maintained to be greater than or equal to a second ratio for more than a predetermined time.

15. The vehicle of claim 9, wherein the controller is further configured to recognize a monitoring area in the first image of the image display, and to obtain the tilting angle of the camera based on position information of a corner of the first image and position information of a corner of the monitoring area.

16. The vehicle of claim 15, wherein the controller is further configured to recognize a lane in the first image of the image display and to recognize the monitoring area based on position information of the recognized lane.

17. The vehicle of claim 16, wherein the monitoring area recognized in the first image and the monitoring area recognized in the second image are the same as each other.

18. The vehicle of claim 9, further comprising first and second doors provided on left and right sides of a body of the vehicle, respectively, wherein the camera of the monitoring device is provided in each of the first and second doors.

19. The vehicle of claim 9, further comprising an inputter configured to receive a user input, and a seat whose position is adjusted, wherein
- the storage is further configured to store seat position information of the seat for each driver, and
- the controller is further configured to recognize a driver based on the user input received from the inputter, and to obtain the tilting angle of the camera based on the seat position information corresponding to the recognized driver.

20. The vehicle of claim 19, further comprising a display, wherein the controller is further configured to display notification information on adjustment of the tilting angle of the camera when adjusting the tilting angle of the camera.

* * * * *